United States Patent [19]

Gasiot et al.

[11] Patent Number: 4,517,463

[45] Date of Patent: May 14, 1985

[54] METHOD AND APPARATUS FOR REAL-TIME RADIATION IMAGING

[76] Inventors: Jean Gasiot, Rue de Baillarguet 474, 34960 Clapiers, Herault, France; Peter F. Braunlich, SW. 730 City View, Pullman, Wash. 99163; Jean-Pierre Fillard, St. - Gely-du-Fesc, Herault, France

[21] Appl. No.: 470,912

[22] Filed: Feb. 28, 1983

[51] Int. Cl.³ .............................................. G03C 5/16
[52] U.S. Cl. .................................................. 250/327.2
[58] Field of Search ......................... 250/327.2, 484.1; 364/414

[56] References Cited

U.S. PATENT DOCUMENTS

| | | | |
|---|---|---|---|
| 3,729,630 | 4/1973 | Yamashita et al. | 250/337 |
| 3,975,637 | 8/1976 | Ikedo et al. | 250/327.2 |
| 4,091,284 | 5/1978 | Yamamoto et al. | 250/337 |
| 4,258,264 | 3/1981 | Kotera et al. | 250/484.1 |
| 4,315,318 | 2/1982 | Kato et al. | 382/6 |

OTHER PUBLICATIONS

W. F. Matthews and R. F. Jung, "Laser Line–Scanning Sensors", *Optical Engineering*, vol. 14, No. 2, (Mar.-Apr. 1975), pp. 116–119.

*Primary Examiner*—Janice A. Howell
*Assistant Examiner*—Constantine Hannaher
*Attorney, Agent, or Firm*—Wells, St. John & Roberts

[57] ABSTRACT

Disclosed are a method and apparatus for producing a real-time electronic signal which represents a radiation image. The apparatus includes a source of radiation which bombards a human or other body being examined and produces a radiation image. The radiation image strikes a luminescent phosphor screen thereby ionizing the phosphor and storing information therein which indicates the intensity or total quantity of the ionizing radiation. A scanning laser beam having a high intensity beam is used to very rapidly stimulate the phosphor screen. An emission detector measures the intensity or total quantity of emission from the phosphor screen and creates an electronic signal. The electronic signal is synchronized with information about the position of the scanning laser beam and the delay associated with the phosphor stimulation. An electronic video signal is thereby produced which can be displayed on a conventional video display, recorded or digitized for storage, analysis and enhancement with computers.

20 Claims, 2 Drawing Figures

METHOD AND APPARATUS FOR REAL-TIME RADIATION IMAGING

TECHNICAL FIELD

The technical field of this invention is luminescent radiation imaging apparatus and methods.

BACKGROUND OF THE INVENTION

A variety of radiation imaging techniques and devices are known in the art. One example of radiation imaging devices includes X-ray machines, which have been used for many years to determine the internal structure of humans, animals, and other living and nonliving things. One problem with prior art X-ray machines is that the amount of X-radiation required for a suitable image can have deleterious effects on the subject. Common X-ray machines also are limited because only a single image can be produced and then the X-ray film or plate must be replaced before another image can be made. This system is impractical or impossible to use in producing real-time images. Real-time imaging refers to imaging wherein the image can be displayed simultaneously or nearly simultaneously with the occurrence of the event and preferably in a continuous manner.

Real-time radiation imaging has many potential applications which are not possible at this time because of the inability to very rapidly retrieve image information which has been stored in a luminescent phosphor screen. The idea of using luminescent phosphor screens in radiation imaging is not new and is shown in U.S. Pat. No. 3,975,637 to Ikedo et al. The Ikedo invention is directed to producing an X-ray image on an image storing panel which has a layer of thermoluminescent material or phosphor. The thermoluminescent phosphor stores thermoluminescent energy in an amount dependent upon the amount of X-radiation which strikes the panel. The stored thermoluminescent energy is then released using a laser beam which heats the phosphor at individual points across the screen. The heated phosphor releases the stored thermoluminescent energy creating a visual light emission which is measured with an optical detector and the measurement information is stored so that a composite image can be formed from a large number of points on the screen. The composite image can be used to produce a visual image on a cathode ray tube or similar display. The thermoluminescent stimulation of Ikedo is much too slow for real-time imaging since each scanning of the panel requires 5 seconds. The basic thermoluminescent stimulation process requires heating of each point so it is impossible to reduce the scanning time so that 25-30 images can be produced each second, as required to produce a flicker free real-time image.

U.S. Pat. No. 4,258,264 to Kotera et al discloses a method and apparatus for reading out a radiation image recorded in a stimulable phosphor. The Kotera invention also shows laser stimulation of a phosphor screen for the purpose of producing a radiation image. Kotera, like Ikedo, teaches a phosphor stimulation technique which is much too slow for real-time imaging. Kotera indicates phosphor response times of greater than 100 microseconds and in one example explains that total scanning time for a phosphor plate as being in the range of 5 minutes. Such stimulation and response times are not able to produce real-time images and these patents do not contemplate such an important advancement in the art of luminescent radiation imagery.

The current invention solves the problem of real-time radiation imaging by using novel features which allow for very rapid stimulation of a phosphor panel or screen. The invention also allows the radiation exposure to be kept at very low values, thereby allowing continuous images to be made without deleterious effects upon the subject. Continuous real-time imaging allows a doctor or other examiner to view a body as it is moved into different positions, thereby providing much more effective information for diagnosis or analysis. Other objects and advantages of the invention will be apparent from the specification and claims.

BRIEF DESCRIPTION OF THE DRAWINGS

A preferred and alternate embodiment of this invention is illustrated in the accompanying drawings, in which.

DETAILED DESCRIPTION OF THE PREFERRED EMBODIMENTS

In compliance with the constitutional purpose of the Patent Laws "to promote the progress of science and useful arts" (Article 1, Section 8), applicant submits the following disclosure of the invention.

Figure 1:
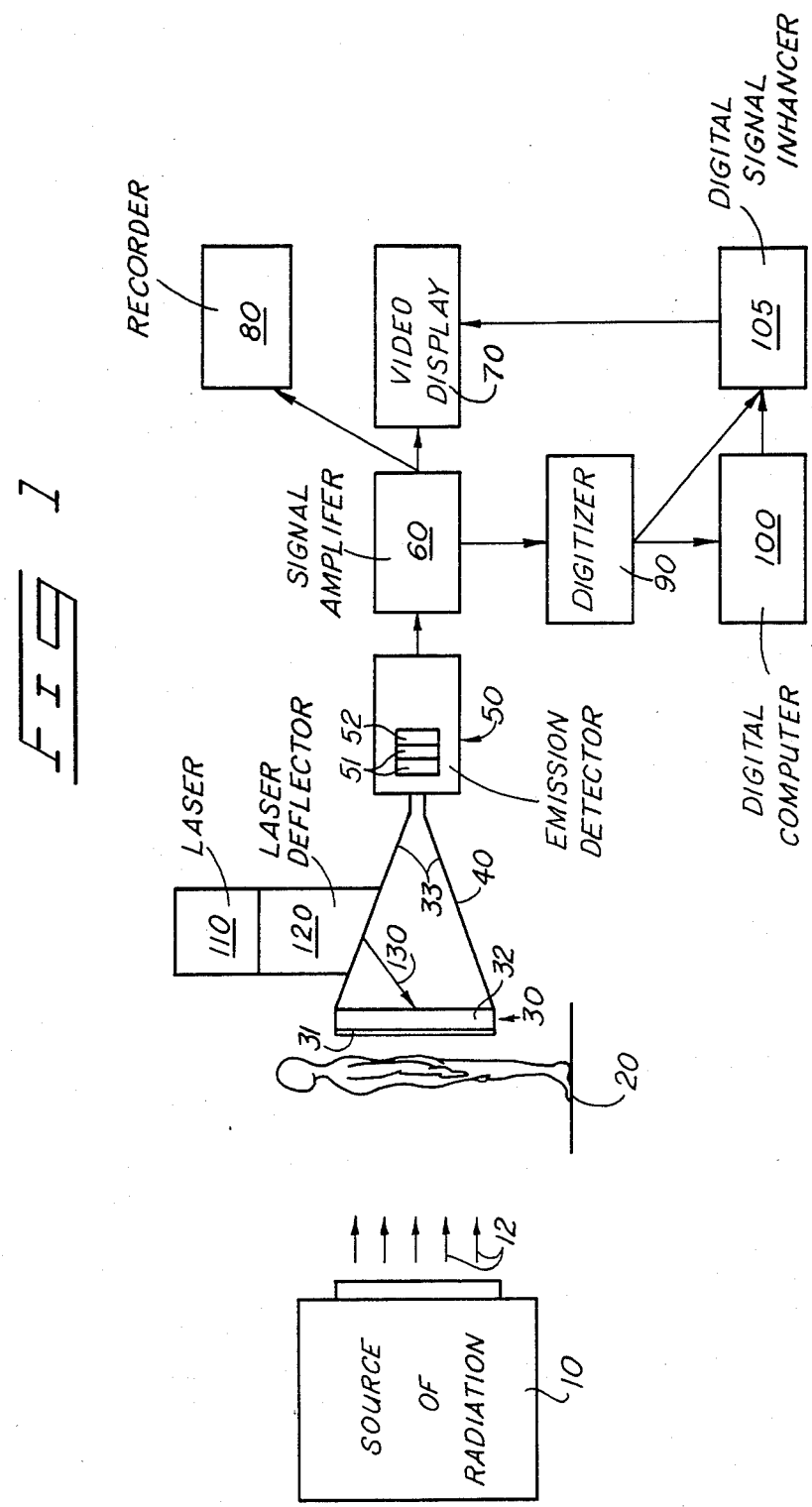
FIG. 1 is a diagrammatic representation of an apparatus according to this invention.

FIG. 1 shows an apparatus according to the invention. The apparatus includes a source of radiation 10 which emits radiation 12 toward a human 20 or other body being examined. Human 20 is interpositioned between the source of radiation 10 and a luminescent phosphor screen 30 so that the radiation 12 passes through and/or around human 20 and strikes phosphor screen 30. The presence of the human causes the configuration and intensity of the radiation 12 to be dispersed and/or attenuated. This creates a radiation image which strikes or impinges upon phosphor screen 30. Radiation images such as X-ray images are particularly important in medicine for the diagnosis of internal conditions which would otherwise require exploratory surgery.

The source of radiation 10 can be designed to produce a wide variety of radiation types in addition to X-rays. Examples of additional appropriate radiation types include ultraviolet, gamma, alpha and beta radiation. Neutrons, protons, and other subatomic particles which are capable of ionizing the luminescent phosphor may also be appropriate in some cases. This invention clearly contemplates any type radiation source, the particular type of radiation chosen being dependent upon the type of object being examined and the type of phosphor being used.

Figure 2:
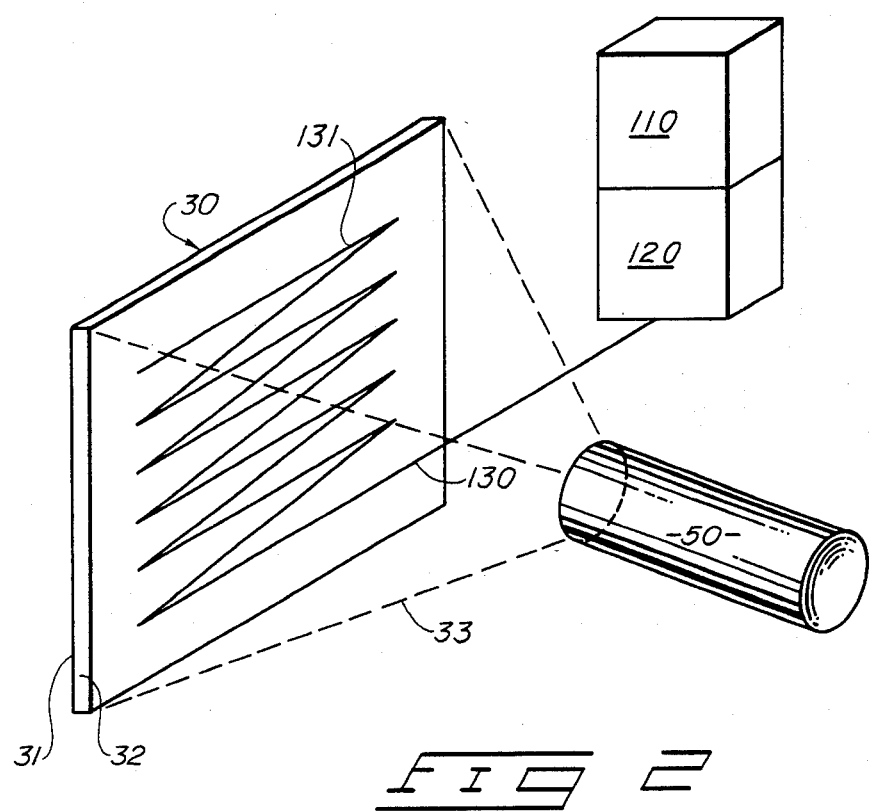
FIG. 2 is a perspective view of the phosphor screen with an attached emission collector shown in phantom; the laser and laser deflector are also shown.

The phosphor screen 30 includes a layer of luminescent phosphor material 31 (FIG. 2) which is supported by a substrate 32. Substrate 32 can be any suitable transparent or translucent material such as glass, quartz, plastic and other such materials. The layer of luminescent phosphor 31 can be made of a number of different phosphors which exhibit the ability to store energy as a result of radiation bombardment and which are also capable of rapidly releasing this stored luminescent energy using the method described below. Examples of phosphors presently known to exhibit these properties include calcium, strontium, magnesium and barium sulfides doped with europium and samarium. Barium sulfide doped with cerium and samarium has also been found acceptable, as is barium fluoro-chloride. Many other phosphors may be appropriate for these purposes but are not definitely known at this time.

Preparation of the phosphors named above is accomplished in the cases of calcium and strontium sulfides by reducing $CaSO_4$ and $SrSO_4$ to their respective sulfides at 900° C. in a $CS_2$ saturated helium atmosphere. Doping is achieved by subsequently heating, in helium for one hour at 950° C. the following pulverized mixtures:

(1) 20 grams (g) $SrS + 1.2$ g $CaF_2 + 1.2$ g $SrSo_4 + 8$ mg $Eu_2O_3 + 19$ mg $Sm_2O_3$; or (2) 20 g $CaS + 1.2$ g $CaF_2 + 8$ mg $Eu_2O_3 + 12$ mg $Sm_2O_3$.

The appropriate luminescent phosphor is preferably deposited upon a substrate material so that it can be easily handled. This can be accomplished by settling a powder suspension of phosphor upon the substrate 31, by adhesion or some other suitable method of application.

The phosphor screen 30 is preferably positioned near an emission collector 40 so that luminescent emissions from the phosphor screen are reflected down the interior of sides 33 and collected so that they can be more easily measured by the emission detector 50. The sides 33 are preferably pyramidal but curved surfaces may also be used. Sides 33 can be constructed of any suitable materials and a reflective interior surface may be either integral therewith or affixed thereto.

The luminescent emissions from the phosphor screen 30 are measured by emission detector 50 which produces an electronic image signal. The emission detector can advantageously be a photomultiplier such as the RCA model 6199. Emission detector 50 can be designed to measure visible light or some other appropriate wavelengths of electromagnetic radiation which corresponds to the emission wavelength of the phosphor being used. Emission detectors are well-known in the art and are readily available. In most cases the emission detector will include filters 51 and/or dichroic reflector 52 to attenuate or eliminate dispersed light, infrared light or other scattered beams from the laser 110. The luminescent emissions from screen 30 are at a different wavelength from the laser thereby allowing the effects of such stray laser beams to be eliminated from the measurements taken by the emission detector.

The emission detector 50 provides an electronic image signal which can be amplified by signal amplifier 60 and displayed by video display 70. The electronic image signal can also be recorded on recorder 80 or can be digitized by digitizer 90 for computerized storage in computer 100. The digitized signal can also be enhanced by a digital signal enhancer 100 or other computerized imaging processing equipment. The video signal may also be processed and enhanced without first digitizing. The signal amplifier 60, video display 70, recorder 80, digitizer 90, digital computer 100, and image enhancer 105 are well-known in the art and are readily available for use in the current invention.

The apparatus of FIG. 1 also includes a laser 110 and a laser deflector 120 which create and direct the stimulating laser beam 130 which strikes the phosphor screen 30 to cause the luminescent emission to occur. Laser 110 can advantageously be a neodymium yttrium aluminum garnet (YAG) laser. Other types of lasers can alternatively be used such as dye lasers.

The laser beam from laser 110 is beamed into laser deflector 120 which deflects the laser beam 130 causing it to scan over the phosphor screen 30 and stimulate the phosphor to produce luminescent emissions. The internal rotating mirrors or other deflection apparatus in laser deflector 120 are well-known in the art and a variety of such deflectors can be used. U.S. Pat. No. 3,975,637 shows a number of possible laser deflectors, others are also available. It is also possible to stimulate phosphor screen 30 from the opposite side from that shown in FIG. 1.

The rapid stimulation of the phosphor screen will now be considered. To better understand the rapid stimulation of the phosphor screen, it is desirable to first understand how the phosphor stores energy from the radiation. The scientific model which best describes this phenomenon recognizes that the phosphor contains ions of at least two different types. The bombardment of the phosphor by ionizing radiation such as mentioned above causes electrons associated with one type of ion to shift or migrate to another ion. This migration of electrons between ions requires energy which is supplied by the ionizing radiation produced by source of radiation 10. This migration is often termed "trapping". The energy state of the trapped electron is higher than before migration occurs, but the new position or ion association is stable and requires additional energy or stimulation to break the trapped electron free. The stimulation of the phosphor by the laser beam 130 provides the energy needed to free the trapped electron, in a process often called "detrapping". The way in which the stimulation energy is supplied determines whether the electron is freed and returns to the lower energy state or whether the electron is merely excited and falls back into association with the higher energy state ion. If the electron is detrapped, then energy is released in the form of a luminescent emission which is often visible.

Prior art thermoluminescent stimulation techniques such as used in U.S. Pat. No. 3,975,637 to Ikedo et al uses a laser to physically heat the molecular lattice of the phosphor, thereby providing the energy needed to detrap the electrons and bring about luminescent emission. This approach has the substantial limitation that the phosphor must be capable of withstanding repeated temperature increases with loss of structural strength or image storing ability. Contact heating and heating using lasers or conventional stimulating beams such as infrared lamps also require that the temperature of the phosphor increase in order to detrap the stored luminescent energy. Many phosphors are not capable or well-suited to high temperature cycling and cannot be used with the prior art stimulation methods.

The current invention uses a new method for stimulating the phosphor to bring about detrapping. The new method requires that an intense laser beam strike the phosphor which was previously exposed to ionizing radiation. The wavelength of the laser beam should be approximately the same as the stimulation wavelength of the phosphor material which is being used. In the case of the calcium and strontium sulfides doped with europium and samarium which were described above, the stimulation spectra are centered at 1.18 and 1.02 micrometers, respectively. A stimulating YAG laser having a laser beam wavelength of approximately 1.064 micrometers was found to properly stimulate both of these phosphors. These phosphors emitted their luminescent energy at wavelength spectra centered at approximately 630 and 590 nanometers respectively.

The intense laser beam 130 used to detrap the phosphor screen 30 must have a high photon flux density and must occur for a sufficient enough length of time to allow the trapped electrons to become detrapped. In experiments, it has been found that photon flux densities of greater than $5 \times 10^{19}$ photons per second and per square millimeter must be used to bring about substantial detrapping of the two phosphors described immediately above. Photon flux densities of about $10^{21}$ photons per second and per square millimeter are preferable. Other phosphors may have substantially different photon flux density requirements and the current invention clearly contemplates such alternatives. The exact photon flux density needed for alternative phosphors is not immediately known but can clearly be found by minor experimentation which is obvious to one of ordinary skill in the art.

The intense laser beam stimulation technique appears to operate via a completely different physical phenomenon when compared to prior art techniques. This is born out by the very fast response times and the absence of significant heating of the phosphor. The prior art heat stimulation caused vibrations of the molecular lattice which caused random detrapping of ionized electrons. The intense laser beam appears to directly stimulate the electrons into detrapping, rather than the two step heating and resultant emission process of the prior art. The response times dramatically show the differences between the stimulation methods. Using intense laser stimulation, an appropriate phosphor can be nearly completely detrapped in times ranging between 50 and 200 nanoseconds, usually 100-200 nanoseconds. It may be desirable in some cases to stimulate for times of 1000 nanoseconds or greater. This must be compared with the fastest prior art response times of 100 microseconds indicated by the Kotera patent cited above. U.S. Pat. No. 3,729,630 to Yamashita indicates thermoluminescent response times of approximately ½ sec. Neither prior art stimulation time is sufficiently fast to allow real-time imaging on a continuous basis.

The invention includes not only an apparatus for real-time radiation imaging but also a method for producing a real-time electronic image signal. The method first requires directing a beam of ionizing radiation 12 at a luminescent phosphor screen 30. A body being examined such as the human 20 is interpositioned between the source of ionizing radiation 10 and the phosphor screen 30. The presence of the interposed body 12 causes intensity variations in the ionizing radiation which creates a radiation image which strikes the phosphor screen. The radiation image ionizes the phosphor screen to an extent which varies across the screen and is representative of the radiation image. It has been found that ionization of the phosphor and the subsequent luminescent emission are approximately proportional to the amount of ionizing radiation or to the peak intensity of the ionizing radiation. This proportionality facilitates the ease of interpretation of the luminescent emission measurements from the phosphor screen 30.

Once the radiation image is represented by ionization of the phosphor screen, then this image information can be retrieved. This is accomplished by scanning the phosphor screen 30 with an intense beam of laser light having a wavelength approximately equal to the stimulation wavelength of the phosphor screen. The scanning laser beam 130 scans across the phosphor screen in preferably a predetermined sequence such as 131 in FIG. 2. The rate of scanning occurs at a velocity at screen 30 which provides for sufficient stimulation time so that detrapping of the phosphor layer 31 will occur at points along substantially the entire length of the scanning sequence 131. Minimum stimulation times of approximately 100-200 nanoseconds were found necessary in order to bring about nearly complete detrapping for the phosphors described above. The scanning rate would thus be determined by the width of the laser beam 130 and the necessary minimum stimulation time. The minimum stimulation time may also be slightly dependent upon the photon flux density of the laser beam.

As the scanning laser beam proceeds over the phosphor screen, the locational points along scanning sequence or line 131 undergo detrapping and a luminescent emission occurs which varies both in intensity and total quantity of emission. The intensity and total quantity of emission are dependent upon the amount of ionizing radiation which has struck the phosphor screen at a particular point. The amount ionizing radiation is effectively accumulated since the previous complete or nearly complete detrapping.

The intensity or total quantity of the luminescent emissions from screen 30 are measured by emission detector 50. The output of emission detector 50 is an electronic signal which is synchronized with the position of the laser beam 130 on screen 30 to provide an electronic video signal. The synchronization must account for the delay between stimulation by laser beam 130 and the subsequent emission. Means for synchronizing may occur by having the laser beam 130 scan across the screen in one direction with an appropriate time break occurring while the beam returns across the screen before the next line is scanned.

In many cases the emission begins only 4 nanoseconds after the intense laser beam stimulates the phosphor layer 31. The emissions may be significant for periods of between 50-200 nanoseconds. Thus it can be seen that if there are $10^5$ locational image points on phosphor screen 30 then it will require approximately $5 \times 10^{-3}$ to $2 \times 10^{-2}$ seconds to scan the screen once. These scan times correspond to 200 to 50 images per second. Flicker free images are produced with 25-30 images per second. Thus the real-time imaging is clearly possible using this method. Greater or less numbers of locational image points may be used consistent with the size of the screen, scanning rate and resolution which is required.

The invention functions in a substantially continuous manner with the scanning laser beam 130 passing repeatedly over all desired points on screen 30. The beam preferably scans the entire screen at least 25-30 times per second.

Any particular point on the screen 30 spends most of its time storing the incoming radiation 12 and only a brief portion being stimulated and giving off the luminescent emission. An illustrative example is where the combined stimulation and emission time is 200 nanoseconds and the laser beam 130 scans across the point 30 times every second. The scanning rate of 30 times per second corresponds to a total period of approximately $3.3 \times 10^{-2}$ seconds per cycle or $3.3 \times 10^7$ nanoseconds per cycle. Since the combined stimulation and emission time requires only 200 nanoseconds then the percentage of time spent collecting the radiation image is well in excess of 99.999%. The time during which no radiation data is collected and the stimulation and emission occurs is less than 0.001%. Thus it is clear that the time required for the stimulation and emission process creates an insignificant amount of error. This, combined with the ability to accurately read the level of emissions, provides for accurate and flexible radiation imaging on a real-time basis.

The real-time imaging can occur with only the brief time delay associated with scanning, measuring and electronically processing the image signal. Such substantially simultaneous display has great advantages in diagnosis and analysis.

The method of the invention also can advantageously include the steps of amplifying the electronic image signal and/or digitizing the signal so that it can conveniently be stored in computerized data storage systems 105 for later retrieval and analysis. Digitalization can also allow computerized analysis and enhancement thereby improving the image signal and visual display thereof or to extract other relevant analysis or data from the image data. The electronic image signal can alternatively be recorded on conventional video recording equipment 80 and played repeatedly for analysis after the examination has occurred.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A method for producing a real-time electronic signal representing a radiation image of a body being examined, comprising:
    directing a beam of ionizing radiation at the body and toward a luminescent phosphor screen positioned behind the body; the ionizing radiation causing migration of electrons within the phosphor screen which results in ionization of the phosphor screen; the degree of ionization of the phosphor screen being variable over the screen and dependent upon the amount of ionizing radiation which passes through or around the body and impinges upon a particular point of the screen;
    scanning the phosphor screen with a laser beam having a wavelength approximately equal to the stimulation wavelength of the phosphor screen; the laser beam having a photon flux density sufficiently intense to rapidly stimulate the phosphor screen and cause very rapid and nearly complete detrapping of the electrons which migrated during ionization of the phosphor screen; the laser beam scanning across particular points of the phosphor screen so as to provide stimulation of the particular points for time periods of between 50 to 200 nanoseconds;
    measuring the luminescent emissions which result from striking the phosphor screen with the laser beam;
    converting the measurements of the luminescent emissions and their associated locations into an electronic signal which is representative of the radiation image impinging upon the phosphor screen; and
    synchronizing the luminescent emission measurements for particular points of the screen with the location of the particular points upon the screen.

2. The method of claim 1 further comprising the step of amplifying the electronic signal.

3. The method of claim 2 further comprising the step of displaying the electronic signal upon a video display, thereby providing a visually observable representation of the radiation image produced by the body being examined.

4. The method of claim 1 wherein the step of scanning the phosphor screen is repeated at least 25 times per second to provide an electronic signal which when displayed appears continuous and free of flicker.

5. The method of claim 1 further comprising the step of digitizing the electronic signal.

6. The method of claim 1 further comprising the steps of amplifying and digitizing the electronic signal.

7. The method of claim 1 wherein the laser beam scans in a predetermined pattern to stimulate a predetermined group of points on the phosphor screen.

8. The method of claim 1 wherein the laser beam scans in a predetermined pattern to stimulate a predetermined group of points which are grouped in substantially continuous lines across the phosphor screen.

9. The method of claim 1 further comprising the step of recording the electronic signal on an appropriate recorder so that the signal can be replayed in the future.

10. The method of claim 5 further comprising the step of enhancing the electronic signal with a digital enhancer.

11. The method of claim 5 further comprising the step of storing and analyzing the electronic signal in a digital computer.

12. The method of claim 1 wherein the laser beam has a photon flux density equal to at least $5 \times 10^{19}$ photons per second and per square millimeter.

13. A method for producing a real-time radiation image of a body being examined, comprising:
    directing a beam of ionizing radiation through the body and at a luminescent phosphor screen to cause migration of electrons within the phosphor of the screen which results in ionization of the phosphor; the degree of ionization of the phosphor screen being variable over the screen and dependent upon the amount of ionizing radiation which passes through or around the body and impinges upon a particular locational point upon the screen;
    striking the phosphor screen with a laser beam to stimulate phosphor screen; the laser beam having a wavelength approximately equal to the stimulation wavelength of the phosphor of the screen; the laser beam also having a photon flux density sufficiently intense to cause very rapid and nearly complete detrapping of the electrons which migrated during ionization of the phosphor screen; particular locational points of the phosphor screen being struck by the laser beam for time periods of between approximately 50 to 1000 nanoseconds;
    measuring the luminescent emissions which result from striking the phosphor screen with the laser beam in a manner which allows the measurements of luminescent emissions from particular points on the phosphor screen to be associated with the location of that point on the phosphor screen;
    converting the measurements from above into an electronic signal indicating both the value and location of the emission measurements; and
    using an electronic video display to transform the electronic signal into a visually perceivable image which represents the radiation image which passes through and around the body and strikes the phosphor screen.

14. The method of claim 13 further comprising the step of collecting the luminescent emissions from the phosphor screen with an emission collector to increase the amount of emissions available for measuring.

15. The method of claim 13 wherein the electronic signal is digitized.

16. The method of claim 13 further comprising the step of amplifying the electronic video signal prior to using an electronic video display to provide a visually perceivable image.

17. An apparatus for transforming a radiation image into a real-time electronic signal which can be recorded or viewed substantially simultaneously in time with the radiation image, comprising:
- a source of ionizing radiation;
- a luminescent phosphor screen positioned to receive ionizing radiation from the source of ionizing radiation; the phosphor screen and source of ionizing radiation being spaced sufficiently far apart so that a body being examined can be interpositioned therebetween; ionizing radiation from said source passing through and around the interpositioned body creating a radiation image thereof which strikes the phosphor screen;
- a scanning laser beam for stimulating the phosphor screen to provide luminescent emissions at a plurality of locational points across the screen; the laser beam having a photon flux density sufficiently intense to cause very rapid and nearly complete detrapping of electrons which have migrated during ionization of the phosphor screen; the laser beam stimulating particular locational points of the phosphor screen for time periods of between approximately 50 to 1000 nanoseconds to provide for nearly complete detrapping;
- an emission detector for measuring the emissions from the plurality of locational points and providing an electronic signal thereof;
- means for synchronizing the location of the stimulated point on the phosphor screen with the corresponding electronic signal of the emission from that point; thereby providing an electronic signal which can substantially simultaneously produce a visual representation of the radiation image or which can be recorded for future reference.

18. The apparatus of claim 17 further comprising a digitizer for digitizing the electronic signal.

19. The apparatus of claim 17 wherein the laser beam has a photon flux density of at least $5 \times 10^{19}$ photons per second and per square millimeter.

20. The apparatus of claim 17 wherein the laser beam has a wavelength approximately equal to the stimulation wavelength of the phosphor screen and which is in the infrared to near infrared range of the electromagnetic spectrum.

* * * * *